(12) United States Patent
Agaram et al.

(10) Patent No.: US 9,228,558 B2
(45) Date of Patent: Jan. 5, 2016

(54) IGNITION MODULE

(71) Applicants: Venkatesh Agaram, Bloomfield, MI (US); Stefan Hertweck, Bloomfield, MI (US)

(72) Inventors: Venkatesh Agaram, Bloomfield, MI (US); Stefan Hertweck, Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 665 days.

(21) Appl. No.: 13/675,001

(22) Filed: Nov. 13, 2012

(65) Prior Publication Data

US 2013/0146011 A1 Jun. 13, 2013

Related U.S. Application Data

(60) Provisional application No. 61/569,003, filed on Dec. 9, 2011.

(51) Int. Cl.
| | |
|---|---|
| *F02N 99/00* | (2010.01) |
| *B60R 25/00* | (2013.01) |
| *B60R 25/20* | (2013.01) |
| *B60R 25/24* | (2013.01) |

(52) U.S. Cl.
CPC ............ *F02N 99/00* (2013.01); *B60R 25/2063* (2013.01); *B60R 25/248* (2013.01)

(58) Field of Classification Search
CPC ..... F02N 99/00; F16K 35/00; B60R 25/2063; B60R 25/248
See application file for complete search history.

(56) References Cited

U.S. PATENT DOCUMENTS

2006/0225985 A1* 10/2006 Dimig ................... B60N 2/442
192/84.1

FOREIGN PATENT DOCUMENTS

| DE | 19951986 C1 | 8/2001 |
|---|---|---|
| DE | 10107992 A1 | 9/2001 |
| EP | 1607289 A1 | 12/2005 |

OTHER PUBLICATIONS

International Search Report dated Mar. 15, 2013 for International Application No. PCT/US2012/067600, International Filing Date Dec. 3, 2012.
Written Opinion dated Mar. 15, 2013 for International Application No. PCT/US2012/067600, International Filing Date Dec. 3, 2012.

* cited by examiner

*Primary Examiner* — Lindsay Low
*Assistant Examiner* — Jacob Amick
(74) *Attorney, Agent, or Firm* — Ralph E. Smith

(57) ABSTRACT

An ignition module includes a housing, a cam, a first lever, a second lever, and an electromagnet is provided. The cam is rotatably supported by said housing between an OFF position and an ON position. The first lever is movable between a first state restricting movement of said cam from said ON position to said OFF position and a second state permitting movement of said cam from said ON position to said OFF position. The second lever is movable between a locked state restricting movement of said first lever from said first state to said second state and an unlocked state permitting movement of said first lever from said first state to said second state. The electromagnet is movable between an extended state and a retracted state. The electromagnet movable into said extended state when energized to position and maintain said second lever in said locked state.

18 Claims, 5 Drawing Sheets

IGNITION MODULE

CROSS-REFERENCE TO RELATED APPLICATION

This application claims the benefit of U.S. Provisional Ser. No. 61/569,003, filed Dec. 9, 2011.

FIELD

The present disclosure relates to ignition modules and more particularly to an ignition module having a release feature permitting removal of a key fob from the ignition module under insufficient power conditions.

BACKGROUND

Ignition modules are typically incorporated into a vehicle to permit a driver to selectively control the vehicle from an OFF state to an ON state. Such ignition modules typically include a receptacle that receives a key and/or key fob that, when rotated or depressed, moves the vehicle from the OFF state to the ON state. The key and/or key fob is typically retained within the ignition when the vehicle is in the ON state to prevent removal of the key and/or key fob from the ignition during use. Once the vehicle is returned to a parked state and the key and/or key fob is returned to an OFF position, the key and/or key fob may be removed from the ignition module.

Vehicle manufacturers have recently incorporated the function of a conventional key and a conventional key fob into a single unit in a continuing effort to simplify operation and use of vehicles. Specifically, a vehicle may incorporate a wireless ignition module that interfaces with a key fob without the need for a conventional key. The key fob functions in a conventional manner in that a user may unlock and lock vehicle doors and may open other access compartments of the vehicle (i.e., a trunk or sliding door) but, also, incorporates the functionality of a conventional key. Namely, the key fob may be inserted into the wireless ignition module and may communicate with the wireless ignition module when depressed or rotated to control the vehicle between the OFF state and the ON state.

A key fob used in conjunction with a wireless ignition module is prevented from being removed from the ignition while the vehicle is in the ON state and the vehicle is not in the parked state. The fob is only permitted to be removed from the ignition module once the vehicle is returned to the parked state and the fob is returned to the OFF position.

Conventional wireless ignition modules typically incorporate a solenoid that works in conjunction with a series of linkages to prevent removal of the fob from the ignition module until the vehicle is returned to the OFF state and the fob is returned to the OFF position. At this point, the solenoid may be energized to actuate the series of linkages and permit removal of the fob from the ignition module.

While conventional ignition modules adequately maintain engagement of the fob and the ignition module when the vehicle is in the ON state and adequately permit removal of the fob from the ignition module when the vehicle is returned to the OFF state, such ignition modules do not permit removal of the fob from the ignition module when the vehicle is incapable of providing sufficient power to actuate the solenoid. For example, when a battery of the vehicle is dead, power cannot be supplied to the solenoid to actuate the linkages and permit removal of the fob from the module. Under such circumstances, the fob remains locked in the ignition module and cannot be removed until power is restored to the vehicle.

SUMMARY

An ignition module is provided and may include a housing and a cam rotatably supported by the housing between an OFF position and an ON position. A first lever may be movable between a first state restricting movement of the cam from the ON position to the OFF position and a second state permitting movement of the cam from the ON position to the OFF position. A second lever may be movable between a locked state restricting movement of the first lever from the first state to the second state and an unlocked state permitting movement of the first lever from the first state to the second state. An electromagnet may be movable between an extended state and a retracted state and may be movable into the extended state when energized to position and maintain the second lever in the locked state.

In another configuration, an ignition module for a vehicle having an energy source is provided and may include a housing and a cam rotatably supported by the housing between an OFF position and an ON position. A first lever may be movable between a first state restricting movement of the cam from the ON position to the OFF position and a second state permitting movement of the cam from the ON position to the OFF position. A second lever may be movable between a locked state restricting movement of the first lever from the first state to the second state and an unlocked state permitting movement of the first lever from the first state to the second state. An electromagnet movable between an extended state and a retracted state may be movable into the extended state to position and maintain the second lever in the locked state. A release mechanism may permit movement of the cam from the ON position to the OFF position when power from the energy source is insufficient to move the electromagnet between the extended state and the retracted state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
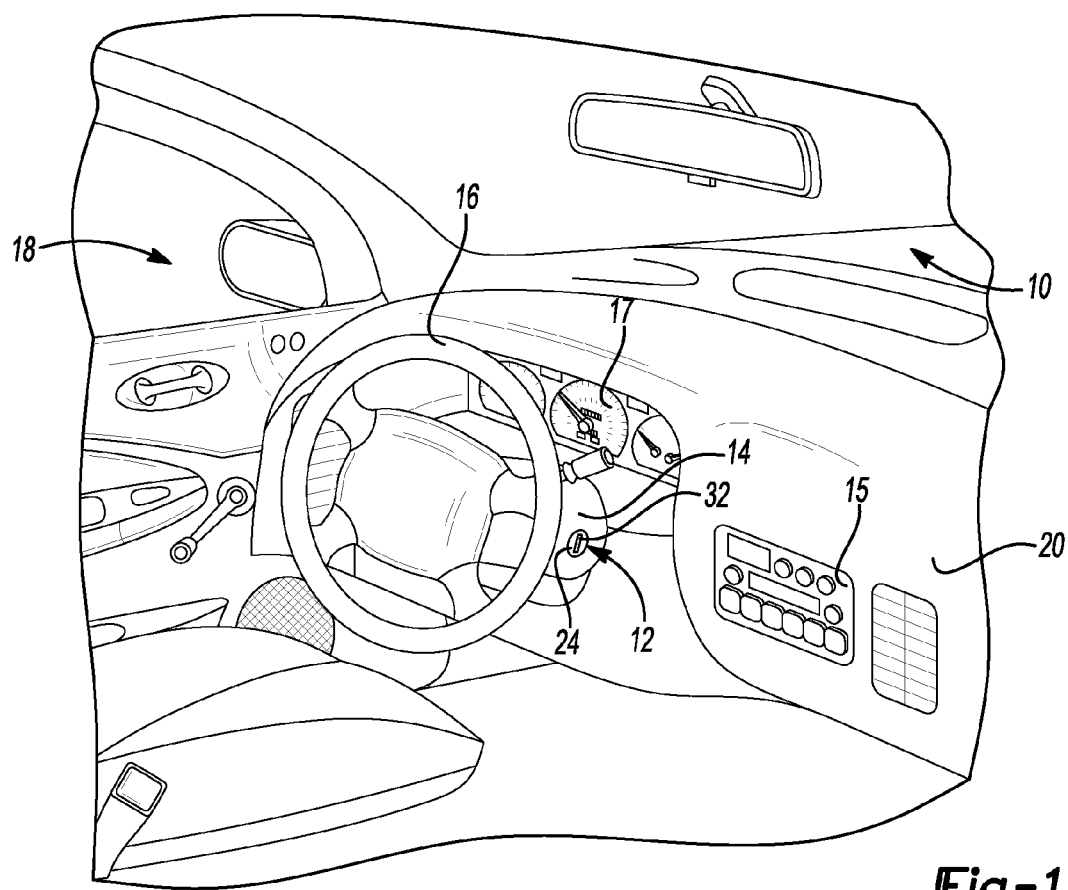
FIG. 1 is a partial perspective view of a passenger compartment of a vehicle incorporating an ignition module in accordance with the principles of the present disclosure.

The following description of the preferred embodiments is merely exemplary in nature and is in no way intended to limit the invention, its application, or uses.

With reference to the figures, a vehicle 10 is provided and may include an ignition module 12. The ignition module 12 may be associated with a steering column 14 and steering wheel 16 of the vehicle 10 such that the ignition module 12 is a subassembly of the steering column 14 and is positioned in close proximity to the steering wheel 16. While the ignition module 12 is described and shown as being associated with a steering column 14 of the vehicle 10, the ignition module 10 could be located anywhere within a passenger compartment 18 of the vehicle 10. For example, the ignition module 12 could be located in an instrument panel 20 of the vehicle 10.

The ignition module 12 may be a wireless ignition module that selectively receives a key fob (not shown) for use in controlling the vehicle 10 between an ON state and an OFF state and for supplying power to various subsystems of the vehicle 10. For example, the key fob may be used to position the ignition module 12 and, thus, the vehicle 10, in an ACCESSORY state (FIG. 4), that supplies power to vehicle accessories such as, for example, a radio 15 or other vehicle instruments 17 but does not change an operating state of the vehicle 10 from the OFF state to the ON state.

The key fob may be an integrated key fob that allows for operation of various subsystems of the vehicle 10 while concurrently allowing an operator to control the vehicle 10 between the OFF state, the ON state, and the ACCESSORY state. For example, the key fob may permit an operator to lock and unlock vehicle doors 19, open and close rear or side closure panels depending on the particular vehicle, and/or initiate an alarm function of the vehicle 10. The key fob may additionally include an integrated key such that when the key fob is received by the ignition module 12, the key fob allows the user to manipulate the ignition module 12 and, thus, the vehicle 10, between the OFF state, the ON state, and the ACCESSORY state.

The ignition module 12 is described as being a wireless ignition module, as the ignition module wirelessly communicates with the key fob to properly identify the key fob when received by the ignition module 12. Further, the ignition module 12 may control operation of the vehicle 10 amongst the ON state, the OFF state, and the ACCESSORY state by wirelessly communicating with a body controller (not shown) of the vehicle 10, for example, when the key fob is received by the ignition module 12. The ignition module 12 may include a processor and memory (neither shown) for accomplishing wireless communication between the ignition module 12 and the key fob and for accomplishing wireless communication between the ignition module and the body controller.

During operation, the ignition module 12 may receive the key fob and may first identify the key fob. If the correct key fob is received by the ignition module 12, the ignition module 12 may allow an operator to utilize the key fob and control the vehicle 10. If, however, an incorrect key fob is received by the ignition module 12, the ignition module 12 may identify the incorrect key fob and will not permit an operator to control the vehicle 10.

Once the ignition module 12 receives and identifies the correct key fob, a force may be applied to the key fob to control operation of the vehicle 10. For example, the key fob may be rotated into various positions to control an operating state of the vehicle 10. Namely, the key fob may be first rotated from an OFF position to an ACCESSORY position that allows an operator to control various subassemblies or accessories of the vehicle 10. The key fob may additionally be rotated from the ACCESSORY position past the ON position to an IGNITE position in an effort to start an engine (not shown) of the vehicle 10. Once the engine is started, the key fob may be automatically rotated from the IGNITE position to the ON position when the vehicle 10 is running. Again, because the ignition module 12 may be a wireless ignition module, when a force is applied to the key fob to rotate the key fob from the OFF position to the ACCESSORY position, IGNITE position, or ON position, the control module 12 may sense a rotational position of the key fob and may relay the rotational position of the key fob to the body controller to allow the body controller to properly control the vehicle 10 based on the detected position of the key fob. For example, when the key fob is initially rotated from the OFF position to the IGNITE position, the ignition module 12 identifies the change in the rotational position from the OFF position to the IGNITE position of the key fob and relays the information to the body controller. The body controller may rely on such information in controlling the engine of the vehicle 10 and may cause the engine to start.

During the foregoing operation, removal of the key fob from the ignition module 12 is typically restricted until the vehicle 10 is in a parked state and the key fob is returned to the OFF position. As will be described in greater detail below, the ignition module 12 restricts removal of the key fob until the vehicle 10 is moved into a parked state and the key fob is rotated into the OFF position. The ignition module 12 additionally permits removal of the key fob under conditions when insufficient power is supplied from the vehicle 10 to the ignition module 12.

With particular reference to FIGS. 2-6, the ignition module 12 is shown to include a housing 22 and a cylinder 24 rotatably supported by the housing 22. The housing 22 may include a series of attachment features 26 that may be used to assemble the ignition module 12 to the steering column 14 or instrument panel 20. The attachment features 26 may position the ignition module 12 relative to and within the steering column 14 or instrument panel 20 to allow a portion of the cylinder 24 to be exposed (FIG. 1).

The cylinder 24 is rotatably supported by the housing 22 such that a first end 28 (FIG. 2) extends from a first side of the housing 22 (FIG. 2) and a second end 30 of the cylinder 24 extends from an opposite side of the housing 22 (FIGS. 3-6). The first end 28 may include a receptacle 32 that selectively receives the key fob. When the key fob is received within the receptacle 32, a force may be applied to the key fob to rotate the key fob and the cylinder 24 relative to the housing 22. As described above, the key fob may be in wireless communication with the ignition module 12 and, as a result, a rotational position of the cylinder 24 and, thus, the key fob relative to the housing 22, may be detected by the ignition module 12 and reported to the vehicle controller.

The second end 30 of the cylinder 24 extends from an opposite side of the housing 22 than the first end 28. The second end 30 may include a cam surface 34 as well as a guide 36 defined by walls 38 extending from the cylinder 24.

Figure 2:
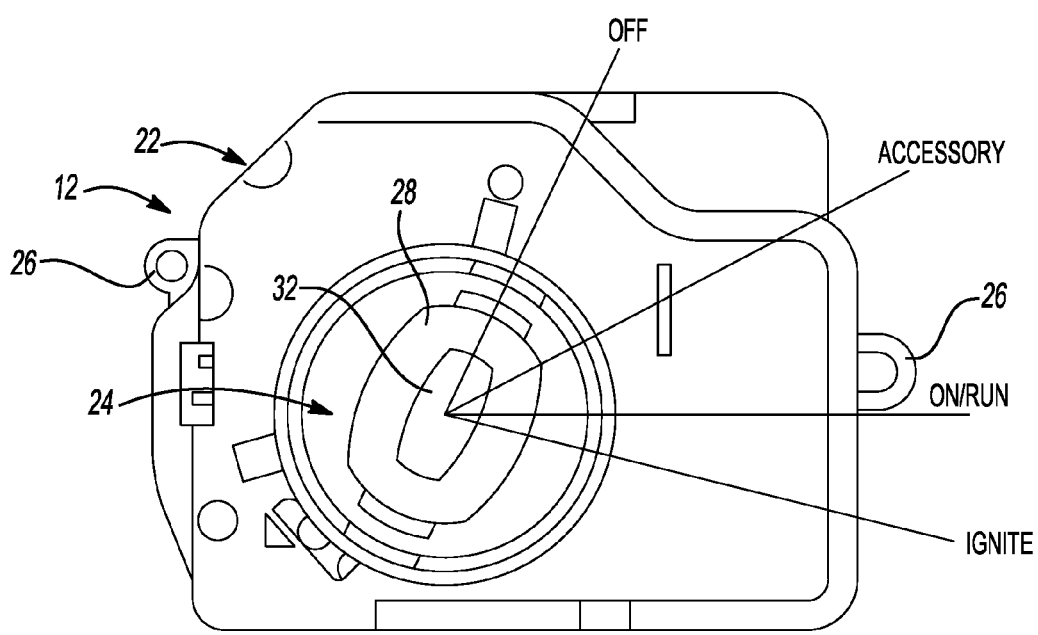
FIG. 2 is a partial front view of an ignition module in accordance with the principles of the present disclosure.
Figure 3:
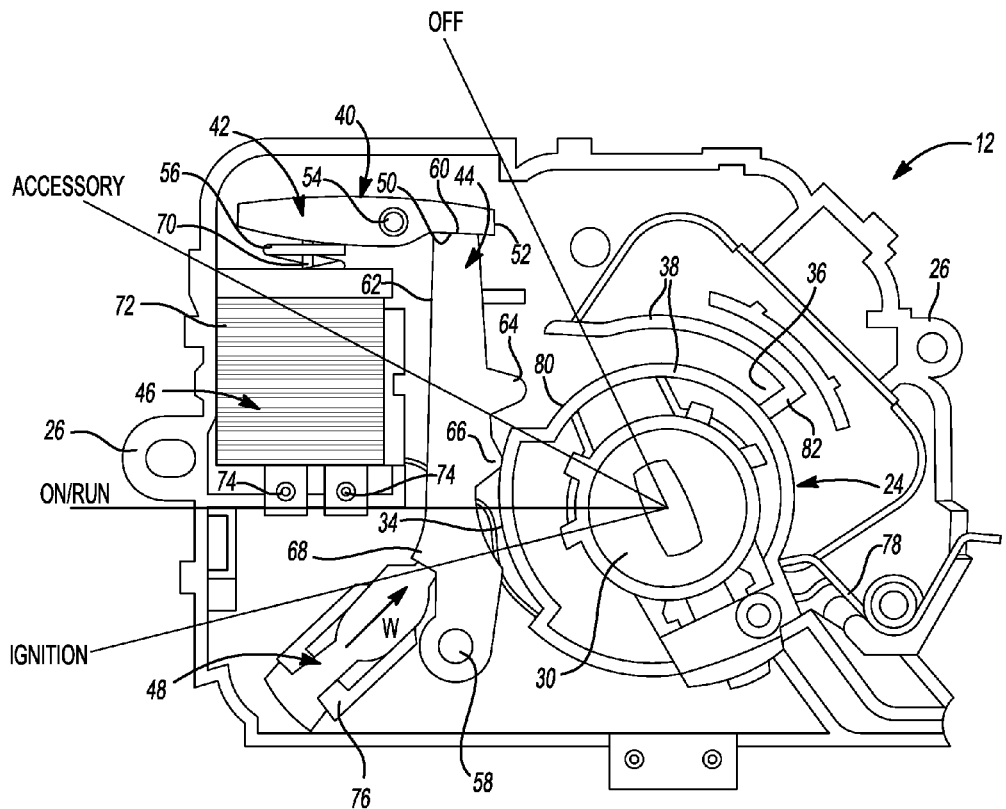
FIG. 3 is a partial rear view of the ignition module of FIG. 2 shown in an OFF state.

With continued reference to FIGS. 2 and 3, the cylinder 24 is shown as being rotatable between an OFF position, an ACCESSORY position, an ON/RUN position, and an IGNITE position relative to the housing 22. The various positions of the cylinder 24 relative to the housing 22 may be accomplished when a key fob is inserted into the receptacle 32 of the cylinder 24 and the key fob is rotated relative to the housing 22.

When the key fob is received in the receptacle 32 of the cylinder 24, the ignition module 12 first identifies the key fob. If the correct key fob is inserted in the receptacle 32, the ignition module 12—via the body controller—permits a user to control the vehicle 10 and vehicle subsystems by simply applying a rotational force to the cylinder 24 via the key fob to rotate the cylinder 24 between the various positions shown in FIGS. 2 and 3. If, on the other hand, an incorrect key fob is inserted into the receptacle 32 of the cylinder 24, the ignition module 24 may identify the key fob as being an incorrect key fob. Upon identifying an incorrect key fob, the ignition module 12 may wirelessly communicate a signal to the body controller, for example, instructing the body controller to prevent operation of the vehicle 10 and any accessories of the vehicle 10. Specifically, while the key fob and cylinder 24 may be permitted to rotate relative to the housing 22, the ignition module 22 may prevent operation of the vehicle 10 and any vehicle accessories by communicating to the body controller that an incorrect key fob is received in the ignition module 12.

Figures 5, 6:
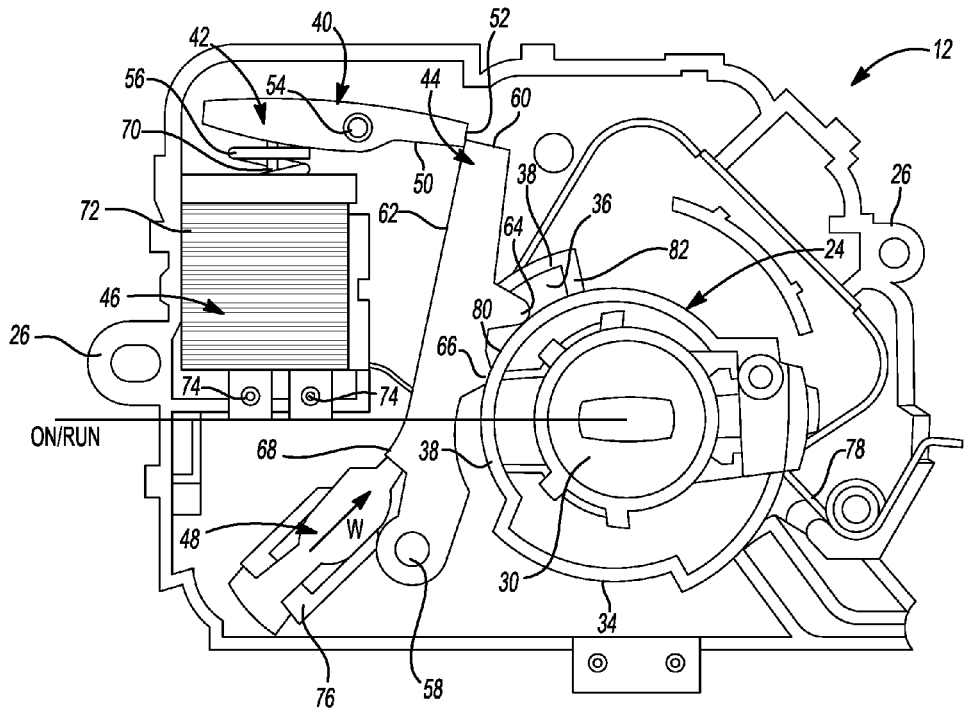
FIG. 5 is a partial rear view of the ignition module of FIG. 2 shown in an ON position.
FIG. 6 is a partial rear view of the ignition module of FIG. 2 shown in an OFF position.

With particular reference to FIGS. 2 and 6, the ignition module 12 is shown as including a locking mechanism 40 that selectively prevents rotation of the cylinder 24 relative to the housing 22 to prevent inadvertent removal of the key fob from the receptacle 32 when the vehicle 10 is in the RUN state, the ACCESSORY state, or the IGNITE state. The locking mechanism 40 may include a locking member 42, a lever 44, an electromagnet 46, and a biasing member 48. The locking member 42 may include a first engagement surface 50 and a second engagement surface 52 in selective engagement with the lever 44. The locking member 42 may be rotatably supported by the housing 22 by a pivot 54 and may be biased in the counterclockwise direction relative to the view shown in FIG. 3 by a biasing member 56.

The lever 44 may be pivotably supported by the housing 22 by a pivot 58 to permit the lever 44 to move relative to the housing 22 when the cylinder 24 is moved between the OFF state, the ACCESSORY state, the ON/RUN state, and the IGNITE state (FIGS. 2 and 3). The lever 44 may include a first engagement surface 60, a second engagement surface 62, an extension 64, a cam follower 66, and a shoulder 68. The first engagement surface 60 may be in selective contact with the first engagement surface 50 of the locking member 42 while the second engagement surface 62 may be in selective contact with the second engagement surface 52 of the locking member 42. The extension 64 may be slidably received within the guide 36 of the cylinder 24 when the cylinder 24 is rotated relative to the housing 22. The cam follower 66 may be disposed proximate to the extension 64 and may contact the cylinder 24 when the cylinder 24 is rotated from the OFF position to any of the ACCESSORY position, the ON/RUN position, or the IGNITE position. The shoulder 68 may extend generally from the lever 44 and may be in contact with the biasing member 48 to allow the biasing member 48 to apply a force to the lever 44.

Electromagnet 46 may be supported by the housing 22 and may include an output shaft 70 and a wound core 72. The output shaft 70 may be moved between an extended state (FIGS. 3-5) and a retracted state (FIG. 6) by selectively supplying current to the wound core 72 of the electromagnet 46. The current may be supplied to the wound core 72 at one or more terminals 74 that are in electrical communication with the wound core 72.

The biasing member 48 may be received within a seat 76 of the housing 22 to allow attachment of the biasing member 48 to the housing 22. The biasing member 48 may include a spring or other biasing element (not shown) that exerts a force on the shoulder 68 of the lever 44 in a direction W. The force exerted on the lever 44 at the shoulder 68 causes the lever 44 to be biased in the clockwise direction relative to the views shown in FIGS. 3-5.

With particular reference to FIGS. 2-6, operation of the ignition module 12 will be described in detail. When the vehicle 10 is initially at rest, the ignition module 12 is in the OFF position (FIGS. 2 and 3). The ignition module 12 may be biased into the OFF position by a biasing element 78 that applies a force to the cylinder 24, thereby causing the cylinder 24 to be biased in the clockwise direction relative to the views shown in FIGS. 3-5.

A key fob may be inserted into the receptacle 32 to allow an operator to rotate the cylinder 24 relative to the housing 22. When the key fob is initially received in the receptacle 32, the ignition module 12 may first identify the key fob via wireless communication. If the key fob is not identified or is identified as being an incorrect key fob, the ignition module 12 may permit rotation of the key fob and cylinder 24 relative to the housing 22 but will send a signal to the body controller of the vehicle 10, for example, to prevent use of the vehicle 10 and any vehicle accessories. If, on the other hand, the ignition module 12 recognizes the key fob, the ignition module 12 will permit the user to not only rotate the key fob and cylinder 24 relative to the housing 22 but, also, will permit use of the vehicle 10 and any vehicle accessories by sending a signal to the body controller that the correct key is disposed within the receptacle 32.

A force may be applied to the cylinder 24 to rotate the cylinder 24 relative to the housing 22 by applying a rotational force to the key fob. When the cylinder 24 is initially rotated relative to the housing 22, the cylinder 24 is rotated from the OFF position to the ACCESSORY position. At this point, the electromagnet 46 is energized, thereby causing the output shaft 70 of the electromagnet 46 to extend from the wound core 72 and apply a force on the locking member 42. The force applied to the locking member 42 causes the locking member 42 to rotate in the clockwise direction relative to the views shown in FIGS. 3-5 about the pivot 54.

Figure 4:
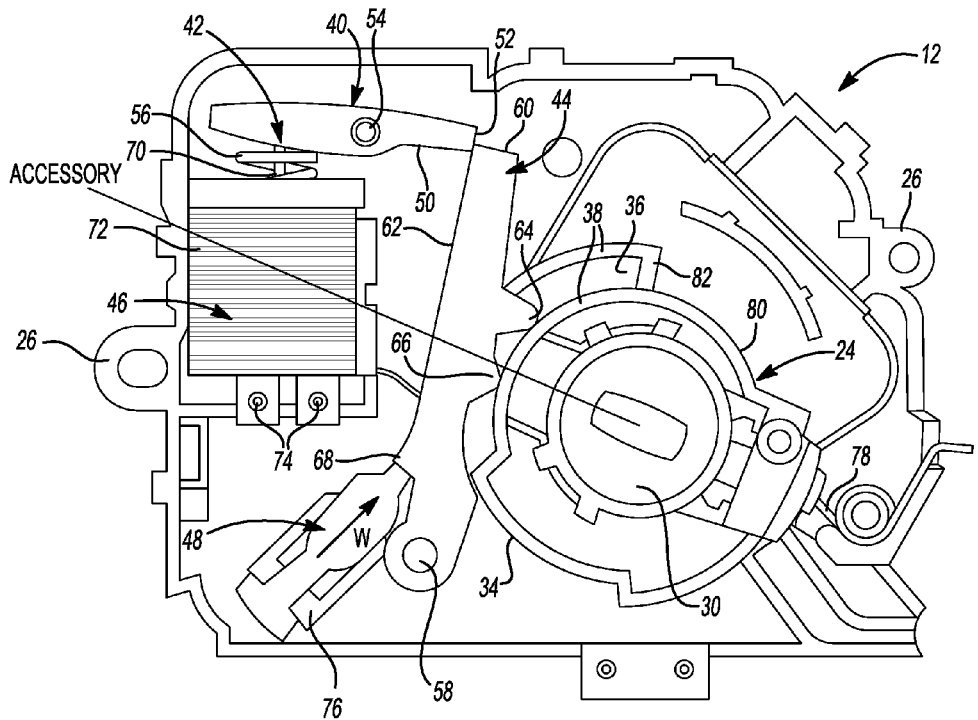
FIG. 4 is a partial rear view of the ignition module of FIG. 2 shown in an accessory position between an OFF position and an ON position.

When the cylinder 24 is sufficiently rotated in the counterclockwise direction relative to the views shown in FIGS. 3-5 from the OFF position to the ACCESSORY position, the cam follower 66 of the lever 44 disengages the cam surface 34 of the cylinder 24 and, as a result, permits the biasing member 48 to rotate the lever 44 in the clockwise direction relative to the views shown in FIGS. 3-5 about the pivot 58.

When the lever 44 is sufficiently rotated in the clockwise direction relative to the views shown in FIGS. 3-5, the first engagement surface 50 of the locking member 42 disengages the first engagement surface 60 of the lever 44, thereby allowing the output shaft 70 of the electromagnet 46 to rotate the locking member 42 about the pivot 54 clockwise such that the second engagement surface 52 of the locking member 42 contacts the second engagement surface 62 of the lever 44 (FIG. 4). At this point, the cylinder 24 is in the accessory position and the extension 64 and cam follower 66 of the lever 44 are in contact with the wall 38 of the cylinder 24, with the extension 64 being at least partially received within the guide 36. When the ignition module 12 is in the ACCESSORY position, the ignition module 12 may send a signal to the body controller, instructing the body controller to provide power to the accessories of the vehicle 10 to allow the operator to use the various accessories of the vehicle 10.

When the cylinder 24 is in the ACCESSORY position, such that the locking member 42 is permitted to rotate in the clockwise direction relative to the views shown in FIGS. 3-5, the second engagement surface 52 of the locking member 42 may contact the second engagement surface 62 of the lever 44 to prevent rotation of the lever 44 about the pivot 58 in the counterclockwise direction relative to the views shown in FIGS. 3-5. Preventing rotation of the lever 44 relative to the housing 22 in the counterclockwise direction relative to the views shown in FIGS. 3-5 prevents the cylinder 24 from returning to the OFF position and, thus, prevents removal of the key fob from the receptacle 32. Specifically, the key fob may only be removed from the receptacle 32 of the cylinder 24 when the cylinder 24 is in the OFF position. Therefore, if the cylinder 24 is prevented from returning to the OFF position due to engagement between the locking member 42 and the lever 44, the key fob will remain within the receptacle 32 and is prevented from being removed from the cylinder 24 when the cylinder 24 is in the ACCESSORY position.

If the force applied to the key fob is released when the cylinder 24 is in the ACCESSORY position, the engine of the vehicle 10 remains off while accessories of the vehicle 10 may be used. Again, the ignition module 12 may communicate with the body controller to instruct the body controller to provide power to the accessories of the vehicle 10 when the cylinder 24 is in the ACCESSORY position. The ignition module 12 may identify the ACCESSORY position by detecting a rotational position of the cylinder 24 relative to the housing 22. The ignition module 12 will remain in the ACCESSORY position until a force is applied to the cylinder 24 via the key fob to either return the cylinder 24 to the OFF position or to advance the cylinder 24 in the opposite rotational direction into the IGNITE position and, finally, into the ON/RUN position.

If a rotational force is applied to the cylinder 24 via the key fob such that the cylinder 24 is returned to the OFF position from the ACCESSORY position, the ignition module 12 identifies the rotational movement of the cylinder 24 relative to the housing 22 and instructs the electromagnet 46 to retract the output shaft 70 into the wound core 72 to allow the locking member 42 to rotate in the counterclockwise direction relative to the views shown in FIGS. 3-5 such that the second engagement surface 52 of the locking member 42 disengages the second engagement surface 62 of the lever 44. The locking member 42 is rotated in the counterclockwise direction relative to the views shown in FIGS. 3-5 by the biasing member 56 disposed generally between the locking member 42 and the electromagnet 46. Therefore, when current is restricted from flowing to the electromagnet 46, the output shaft 70 retracts into the wound core 72, thereby allowing the biasing member 56 to rotate the locking member 42 in the counterclockwise direction relative to the views shown in FIGS. 3-5 and out of engagement with the lever 44.

When the locking member 42 is disengaged from the lever 44, a rotational force applied to the cylinder 24 at the key fob causes the cam surface 34 of the cylinder 24 to engage the cam follower 66 of the lever 44 to rotate the lever 44 in the counterclockwise direction relative to the views shown in FIGS. 3-5 about the pivot 58 and against the biasing force exerted on the shoulder 68 of the lever 44 by the biasing member 48. In other words, permitting rotation of the lever 44 in the counterclockwise direction relative to the views shown in FIGS. 3-5 permits the cylinder 24 to be rotated from the ACCESSORY position to the OFF position.

If the force applied to the cylinder 24 via the key fob rotates the cylinder 24 from the ACCESSORY position to the IGNITE position, the extension 64 and cam follower 66 of the lever 44 ride along an outer surface 80 of the wall 38 and move further into the guide 36. The guide 36 may include a stop 82 that restricts rotation of the cylinder 24 in the counterclockwise direction relative to the views shown in FIGS. 3-5 past the IGNITE position. For example, as the cylinder 24 is rotated from the ACCESSORY position to the IGNITE position and the extension 64 of the lever 44 moves within the guide 36 toward the stop 82, the extension 64 will eventually contact the stop 82, thereby preventing further rotation of the cylinder 24 in the counterclockwise direction relative to the views shown in FIGS. 3-5.

When the cylinder 24 is rotated from the ACCESSORY position to the IGNITE position, the second engagement surface 52 of the locking member 42 maintains engagement with the second engagement surface 62 of the lever 44 to prevent rotation of the lever 44 about the pivot 58 in the counterclockwise direction relative to the views shown in FIGS. 3-5. As described above, preventing rotation of the lever 44 in the counterclockwise direction relative to the views shown in FIGS. 3-5 prevents removal of the key fob from the receptacle 32 when the cylinder 24 is in any of the ACCESSORY position, the ON/RUN position, or the IGNITE position. Once the cylinder 24 reaches the IGNITE position, the force applied to the key fob may be released. Releasing the force applied to the key fob allows the biasing element 78 to rotate the cylinder 24 in the clockwise direction relative to the views shown in FIGS. 3-5 to move the cylinder 24 from the IGNITE position to the ON/RUN position.

The cylinder 24 is permitted to rotate from the IGNITE position to the ON/RUN position and in the clockwise direction relative to the view shown in FIG. 3, as the cam follower 66 is permitted to move along the surface 80 of the cylinder 24 between the ACCESSORY position, the ON/RUN position, and the IGNITE position without applying a force on the lever 44. Specifically, the surface 80 is substantially constant and, as a result, does not apply a force on the lever 44 at the cam follower 66 when the cylinder 24 is rotated relative to the lever 44 between the ACCESSORY position, the ON/RUN position, and the IGNITE position, as the cam follower 66 simply traverses the constant surface 80 when the cylinder 24 is rotated relative to the housing 22 between the various positions. Further rotation of the cylinder 24 into the OFF position is prevented, as the cam follower 66 would necessarily disengage surface 80 and engage cam surface 34, thereby causing a force to be applied to the lever 44. The applied force urges the lever 44 to rotate about pivot 58 in the counterclockwise direction relative to the view shown in FIG. 3. However, the lever 44 is prevented from rotating in the counterclockwise direction relative to the view shown in FIG. 3 until the electromagnet 46 is de-energized and the locking member 42 is disengaged from the lever 44.

At this point, the ignition module 12 detects the rotational position of the cylinder 24 relative to the housing 22 and identifies the position to the body controller, for example. The body controller, upon receiving the position of the cylinder 24, causes the engine to start when the cylinder 24 is in the IGNITE position and continues operation of the engine of the vehicle 10 when the cylinder 24 is in the ON/RUN position.

The engine of the vehicle 10 will continue to run, provided the cylinder 24 is maintained in the ON/RUN position. However, when a force is applied to the cylinder 24 to rotate the cylinder 24 in the clockwise direction relative to the views shown in FIGS. 3-5, the cylinder 24 is rotated from the ON/RUN position toward the ACCESSORY position and OFF position. When the cylinder 24 reaches the OFF position, the ignition module 12 identifies the position of the cylinder 24 relative to the housing 22 and stops the supply of current provided to the electromagnet 46. Restricting current to the electromagnet 46 causes the output shaft 70 to retract into the wound core 72. Retraction of the output shaft 70 allows the biasing member 56 to exert a force on the locking member 42 and rotate the locking member 42 about the pivot 54 in the counterclockwise direction relative to the views shown in FIGS. 3-5.

Upon sufficient rotation of the locking member 42 in the counterclockwise direction relative to the views shown in FIGS. 3-5, the second engagement surface 52 of the locking member 42 disengages the second engagement surface 62 of the lever 44, thereby allowing the lever 44 to be rotated in the counterclockwise direction relative to the views shown in FIGS. 3-5. The lever 44 is caused to rotate in the counterclockwise direction relative to the views shown in FIGS. 3-5 due to engagement between the extension 64 and cam follower 66 with the cam surface 34 of the cylinder 24. The extension 64 and cam follower 66 engage the cam surface 34 when the cylinder 24 is sufficiently rotated in the clockwise direction relative to the views shown in FIGS. 3-5. Rotation of the lever 44 in the counterclockwise direction relative to the views shown in FIGS. 3-5 about the pivot 58 causes the lever 44 to move against the force exerted on the shoulder 68 of the lever 44 by the biasing member 48.

When the cylinder 24 is returned to the OFF position, the first engagement surface 50 of the locking member 42 may be in contact with the first engagement surface 60 of the lever 44. The lever 44 may be maintained in the position shown in FIG. 6 due to engagement between the cam follower 66 of the lever 44 and the cam surface 34 of the cylinder 24. At this point, a force may be exerted on the key fob to remove the key fob from the receptacle 32 as the cylinder 24 is returned to the OFF position.

As described above, when current is supplied to the electromagnet 46, the output shaft 70 extends from the wound core 72 and prevents the biasing member 56 from rotating the locking member 42 in the counterclockwise direction relative to the views shown in FIGS. 3-5. As such, the locking member 42 is positioned to engage the lever 44 when the cylinder 24 is rotated in the counterclockwise direction relative to the views shown in FIGS. 3-5 to prevent the lever 44 from rotating in the counterclockwise direction relative to the views shown in FIGS. 3-5 in an effort to prevent removal of the key fob from the receptacle 32 of the cylinder 24 when the cylinder 24 is in any of the ACCESSORY position, the ON/RUN position, or the IGNITE position. In short, when the cylinder 24 is moved into any of the ACCESSORY position, the ON/RUN position, or the IGNITE position, current is continually supplied to the electromagnet 46 to ensure that the output shaft 70 extends from the wound core 72 and prevents rotation of the locking member 42 in the counterclockwise direction relative to the views shown in FIGS. 3-5.

Should the vehicle 10 experience a power failure such as, for example, a dead battery during use, the current supplied to the electromagnet 46 will cease. Therefore, the output shaft 70 will automatically move into the wound core 72 and the biasing member 56 will be permitted to apply a force on the locking member 42 to rotate the locking member 42 in the counterclockwise direction relative to the views shown in FIGS. 3-5. As described above, permitting rotation of the locking member 42 in the counterclockwise direction relative to the views shown in FIGS. 3-5 permits the lever 44 to likewise be rotated in the counterclockwise direction relative to the views shown in FIGS. 3-5 when the cylinder 24 is rotated in the clockwise direction relative to the views shown in FIGS. 3-5. Sufficient rotation of the cylinder 24 in the clockwise direction relative to the views shown in FIGS. 3-5 allows the cylinder 24 to be moved into the OFF position, which allows an operator to apply a force on the key fob to remove the key fob from the receptacle 32. Therefore, even when the vehicle 10 experiences a power outage, an operator is permitted to remove the key fob from the ignition module 12.

Figure 7:
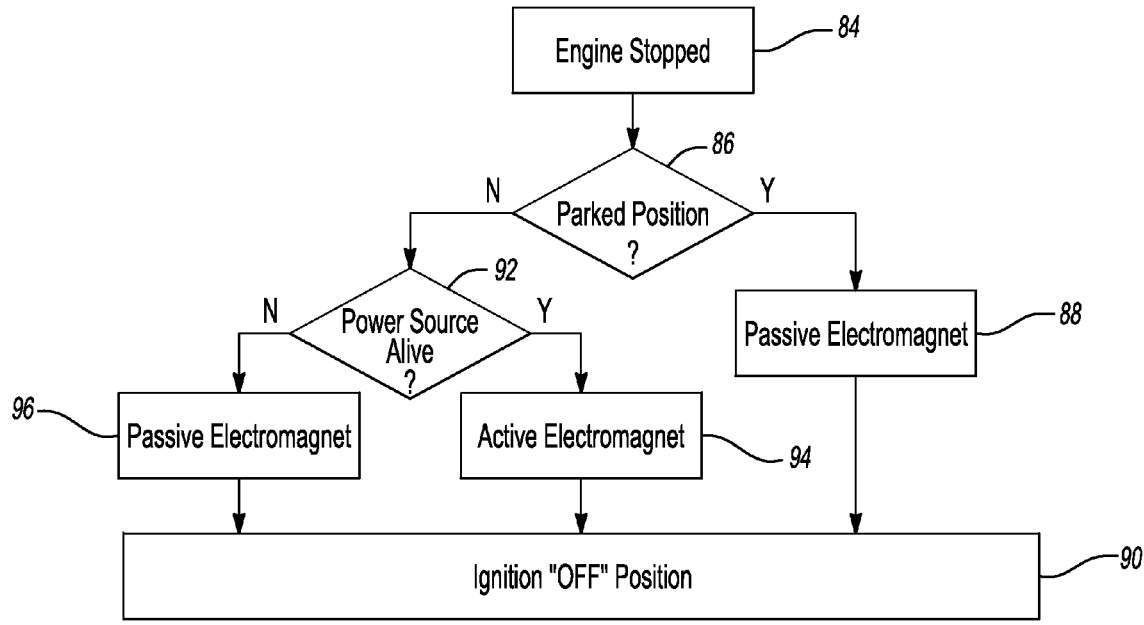
FIG. 7 is a flowchart detailing operation of the ignition module of FIG. 2.

With particular reference to FIG. 7, a flowchart is provided that summarizes the foregoing operation of the ignition module 12. Namely, the ignition module 12 will detect that the engine is stopped at 84. The ignition module 12 will then determine whether the vehicle 10 is in the parked position at 86. If the vehicle 10 is in the parked position at 86, current will not be supplied to the electromagnet 46, thereby resulting in the electromagnet 46 being a so-called "passive" electromagnet 46 at 88. When the electromagnet 46 is not supplied with current, the cylinder 24 may be moved into the OFF position at 90 and the key fob may be removed from the ignition module 12, as previously described.

If the vehicle 10 is not in the parked position at 86, the ignition module 12 will then determine whether the power source of the vehicle 10 is alive at 92. If the power source of the vehicle 10 is determined to be alive at 92, the ignition module 12 will supply the electromagnet 46 with current at 94 to prevent the biasing member 56 from rotating the locking member 42 in the counterclockwise direction relative to the views shown in FIGS. 3-5. As described above, preventing the locking member 42 from rotating in the counterclockwise direction relative to the views shown in FIGS. 3-5 after the cylinder 24 is moved into any of the ACCESSORY position, the ON/RUN position, or the IGNITE position prevents the cylinder 24 from rotating in the clockwise direction relative to the views shown in FIGS. 3-5 and, thus, prevents removal of the key fob from the ignition module 12. The cylinder 24 may be moved into the OFF position at 90 only when the current supplied to the electromagnet 46 is stopped. Restricting current to the electromagnet 46 permits the biasing member 56 to rotate the locking member 42 out of engagement with the lever 44, which permits the cylinder 24 to rotate in the clockwise direction relative to the views shown in FIGS. 3-5 and into the OFF position. Once in the OFF position, the key fob may be removed from the ignition module 12.

If the ignition module 12 determines that the power source of the vehicle 10 is not alive at 92, current cannot and is not supplied to the electromagnet 46, which results in the electromagnet 46 being passive at 96. When the electromagnet 46 is not supplied or cannot be supplied with current, the output shaft 70 is retracted into the wound core 72, thereby allowing the biasing member 56 to once again rotate the locking member 42 out of engagement with the lever 44, which allows the cylinder 24 to be rotated in the clockwise direction relative to the views shown in FIGS. 3-5 and into the OFF position at 90. Once the cylinder 24 is returned to the OFF position, a force may be applied to the key fob to remove the key fob from the ignition module 12.

Figure 8:
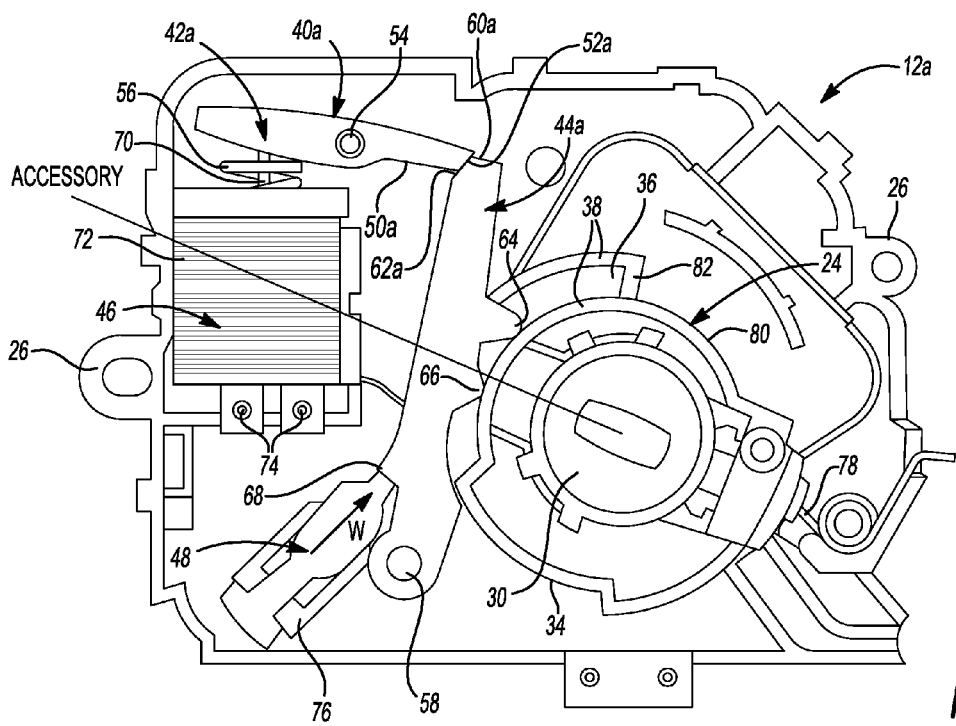
FIG. 8 is a partial rear view of an ignition module in accordance with the principles of the present disclosure.

With particular reference to FIG. 8, an ignition module 12a for use with the vehicle 10 is provided. In view of the substantial similarity in structure and function of the components associated with the ignition module 12 with respect to the ignition module 12a, like reference numerals are used hereinafter and in the drawings to identify like components while like reference numerals containing letter extensions are used to identify those components that have been modified.

The ignition module 12a is substantially similar to the ignition module 12 with the exception that the ignition module 12a includes a locking mechanism 40a in place of the locking mechanism 40. The locking mechanism 40a may include a locking member 42a pivotably supported by a pivot 54 and a lever 44a pivotably supported by a pivot 58. The locking member 42 may include a first engagement surface 50a and a second engagement surface 52a. Likewise, the lever 44 may include a first engagement surface 60a and a second engagement surface 62a. Other than the first and second engagement surfaces 50a, 52a of the locking member 42a and the first and second engagement surfaces 60a, 62a of the lever 44a, the locking member 42a and lever 44a are identical to the locking member 42 and lever 44 of the ignition module 12. As such, a detailed description of the remaining features of the locking member 42a and lever 44a is foregone.

With continued reference to FIG. 8, operation of the ignition module 12a will be described in detail. When the key fob is inserted into the receptacle 32 of the cylinder 24, the cylinder 24 may be rotated from the OFF position to any of the ACCESSORY position, the ON/RUN position, or the IGNITE position. Once the cylinder 24 is moved into one of the ACCESSORY position, the ON/RUN position, or the IGNITE position, the biasing member 56 is permitted to rotate the locking member 42a in the clockwise direction relative to the view shown in FIG. 8. Specifically, current is initially restricted from the electromagnet 46, thereby causing the electromagnet 46 to become passive. When the electromagnet 46 is passive, the biasing member 56 is permitted to extend the output shaft 70 and rotate the locking member 42a in the clockwise direction relative to the view shown in FIG. 8.

For example, should the cylinder 24 be rotated from the OFF position to the ON/RUN position, current will be restricted from reaching the electromagnet 46, which allows the biasing member 56 to rotate the locking member 42a in the clockwise direction relative to the view shown in FIG. 8. Rotation of the locking member 42a in the clockwise direction relative to the view shown in FIG. 8 causes the second engagement surface 52a of the locking member 42a to engage the second engagement surface 62a of the lever 44a to prevent rotation of the lever 44a in the counterclockwise direction relative to the view shown in FIG. 8. Preventing rotation of the lever 44a in the counterclockwise direction relative to the view shown in FIG. 8 likewise prevents rotation of the cylinder 24 in the clockwise direction relative to the view shown in FIG. 8 and into the OFF position due to engagement between the cam follower 66 and the outer surface 80 of the cylinder 24, as described above with respect to the ignition module 12. Preventing rotation of the cylinder 24 in the clockwise direction relative to the view shown in FIG. 8 prevents rotation of the cylinder 24 from the ON/RUN position to the OFF position and, therefore, prevents removal of the key fob from the receptacle 32.

The cylinder 24 may be returned to the OFF position by supplying current to the electromagnet 46. Specifically, supplying current to the electromagnet 46 causes the output shaft 70 to retract into the wound core 72 and, thus, causes rotation of the locking member 42a in the counterclockwise direction relative to the view shown in FIG. 8 against the biasing member 56. Specifically, the locking member 42a is fixed to the output shaft 70. Therefore, when the output shaft 70 is retracted into the wound core 72, the locking member 42a is rotated in the counterclockwise direction relative to the view shown in FIG. 8. The key fob may be removed from the receptacle 32 once the cylinder 24 is returned to the OFF position.

Should the power source of the vehicle 10 be insufficient to provide current to the electromagnet 46 such as, for example, when a battery of the vehicle 10 is dead, a force may be applied to the cylinder 24 via the key fob to override the locking member 42a. Namely, because the second engagement surface 52a of the locking member 42a is formed at substantially the same angle as is the second engagement surface 62a of the lever 44a such that the second engagement surface 52a of the locking member 42a mates with the second engagement surface 62a of the lever 44a, when a force is applied to the cylinder 24 in the clockwise direction relative to the view shown in FIG. 8, the second engagement surface 62a of the lever 44a is permitted to slide along the second engagement surface 52a of the locking member 42a.

Allowing the second engagement surface 62a of the lever 44a to slide along the second engagement surface 52a of the locking member 42a applies a force on the locking member 42a and causes the biasing member 56 to compress. Such movement of the lever 44a in the counterclockwise direction is caused by rotation of the cylinder 24 in the clockwise direction relative to the view shown in FIG. 8 once the cam surface 34 of the cylinder 24 contacts the cam follower 66 of the lever 44a.

While the force applied to the cylinder 24a must be sufficient to overcome the force applied to the locking member 42a by the biasing member 56, the required force is mitigated due to the substantially sloped surfaces of the second engagement surfaces 52a, 62a of the locking member 42a and lever 44a, respectively. Therefore, when the power source of the vehicle 10 is insufficient or otherwise unavailable and the electromagnet 46 cannot be actuated to rotate the locking member 42 in the counterclockwise direction relative to the view shown in FIG. 8, a force may be applied to the cylinder 24 to rotate the cylinder from any of the IGNITE position, ON/RUN position, or ACCESSORY position back to the OFF position to allow removal of the key fob from the receptacle 32.

Figure 9:
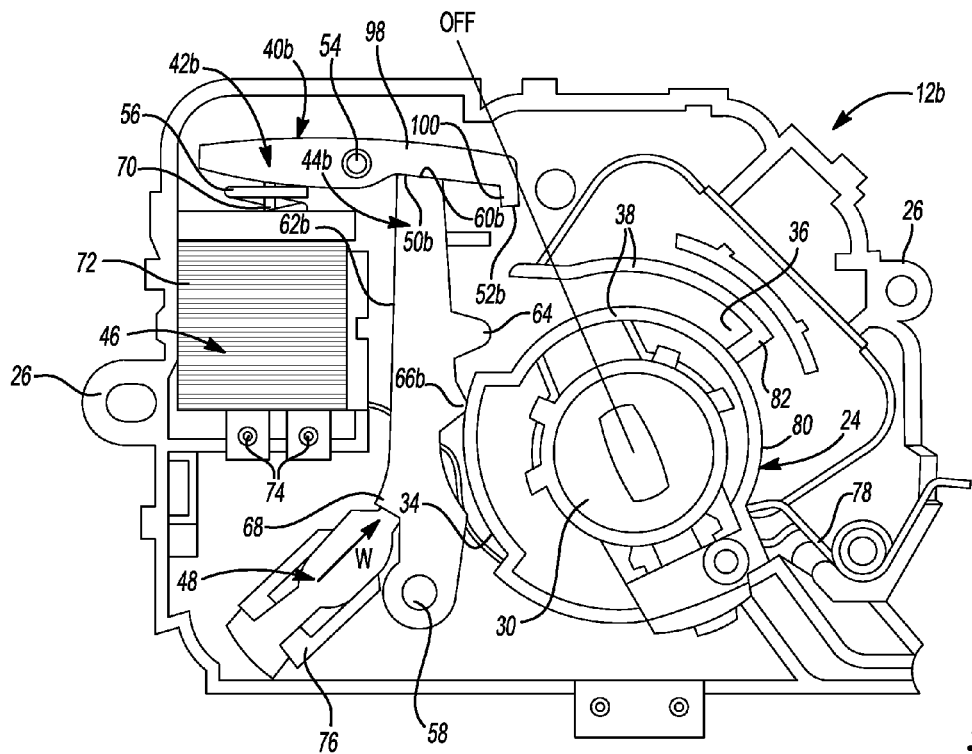
FIG. 9 is a partial rear view of an ignition module in accordance with the principles of the present disclosure.

With particular reference to FIG. 9, an ignition module 12b for use with the vehicle 10 is provided. In view of the substantial similarity in structure and function of the components associated with the ignition module 12 with respect to the ignition module 12b, like reference numerals are used hereinafter in the drawings to identify like components while like reference numerals containing letter extensions are used to identify those components that have been modified.

The ignition module 12b is substantially identical to the ignition module 12 with the exception that the ignition module 12b includes a locking mechanism 40b in place of the locking mechanism 40. The locking mechanism 40b may include a locking member 42b and a lever 40b. The locking member 42b is similar to the locking member 42 of the ignition module 12; however, the locking member 42b includes an elongated portion 98 and a hook portion 100 extending from the elongated portion 98. The lever 44b is similar to the lever 44 of the ignition module 12; however, the cam follower 66b of the lever 44b may extend from the lever 44b to a lesser extent than the cam follower 66 of the lever 44.

In operation, a force may be applied to the cylinder 24 to rotate the cylinder 24 from the OFF position to any of the ACCESSORY position, the ON/RUN position, or the IGNITE position. Under normal operating conditions, the cylinder 24 may be rotated into the ON/RUN position by rotating the cylinder 24 in the counterclockwise direction relative to the view shown in FIG. 9, which causes a force to be applied to the lever 44b due to interaction between the cam follower 66b and the cam surface 34 of the cylinder 24.

When the power source of the vehicle 10 is sufficient, power may be supplied to the electromagnet 46 to allow the cylinder 24 to be rotated in the clockwise direction relative to the view shown in FIG. 9 to return to the OFF position from any of the ACCESSORY position, the ON/RUN position, or IGNITE position. Specifically, supplying power to the electromagnet 46 causes the output shaft 70 to be retracted into the wound core 72, which causes the locking member 42b to be rotated in the counterclockwise direction relative to the view shown in FIG. 9 and out of engagement with the lever 44b. Once the locking member 42b is sufficiently rotated in the counterclockwise direction, the lever 44b is then permitted to rotate in the counterclockwise direction relative to the view shown in FIG. 9 when the cylinder 24 is rotated in the clockwise direction relative to the view shown in FIG. 9 when the cam follower 66b engages the cam surface 34 of the cylinder 24. Once the cylinder 24 is returned to the OFF position, the key fob may be removed from the receptacle 32 of the ignition module 12b.

When the power source of the vehicle 10 is insufficient or otherwise unavailable and, therefore, cannot supply current to the electromagnet 46, the lever 44b is restricted from disengaging the locking member 42b to allow an operator to move the cylinder 24 back to the OFF position and remove the key fob from the receptacle 32 once the cylinder 24 reaches the IGNITE position. Specifically, the elongated portion 98 of the locking member 42 slidably receives the first engagement surface 60 of the lever 44b and permits the first engagement surface 60 of the lever 44b to slide generally along the elongated portion 98 until reaching the projection 100. Whether or not the power supply of the vehicle 10 is available, when the cylinder 24 is rotated from the OFF position to any of the ACCESSORY position, the ON/RUN position, or the IGNITE position, the first engagement surface 60 of the lever 44b is in engagement with the elongated surface 98 of the locking member 42 and does not disengage the locking member 42 until the vehicle 10 is moved into the ON state.

As the cylinder 24 is rotated in a counterclockwise direction relative to the view shown in FIG. 9 and the cam follower 66b disengages the cam surface 34 and moves into the guide 36 of the cylinder 24, the lever 44b rotates in the clockwise direction relative to the view shown in FIG. 9. However, the first engagement surface 60 of the lever 44b maintains engagement with the elongated portion 98 of the locking member 42 and continues to rotate in the clockwise direction relative to the view shown in FIG. 9 until the second engagement surface 62 contacts the projection 100. At this point, the lever 44b is prevented from further rotating in the clockwise direction relative to the view shown in FIG. 9 until the locking member 42b is rotated in the counterclockwise direction relative to the view shown in FIG. 9 such that the projection 100 disengages the second engagement surface 62 of the lever 44b.

Once the projection 100 of the locking member 42 disengages the second engagement surface 62 of the lever 44b, the lever 44b is permitted to continue to rotate in the clockwise direction relative to the view shown in FIG. 9. The locking member 42b is permitted to rotate in the counterclockwise direction relative to the view shown in FIG. 9 when current is supplied to the electromagnet 46, thereby causing retraction of the output shaft 70 into the wound core 72 against the biasing member 56.

If the power source of the vehicle 10 is insufficient or otherwise unavailable to cause the output shaft 70 to retract into the wound core 72 and rotate the locking member 42b in the counterclockwise direction relative to the view shown in FIG. 9, the lever 44b never disengages the projection 100 of the locking member 42b when the cylinder 24 is moved into the ACCESSORY position, the ON/RUN position, or the IGNITE position. Therefore, if a force is applied to the cylinder 24 to rotate the cylinder 24 from the OFF position to any of the ACCESSORY position, the ON/RUN position, or the IGNITE position when the power source of the vehicle 10 is insufficient or otherwise unavailable, the cylinder 24 may be rotated to the OFF position and the key fob may be removed. Specifically, when a force is applied to the cylinder 24 to rotate the cylinder 24 in the clockwise direction relative to the view shown in FIG. 9 from any of the IGNITE position, the ON/RUN position, or the ACCESSORY position back to the OFF position, the cam surface 34 of the cylinder 24 is permitted to engage the cam follower 66 of the lever 44b and is permitted to rotate the lever 44b in the counterclockwise direction relative to the view shown in FIG. 9. Such rotation of the lever 44b in the counterclockwise direction relative to the view shown in FIG. 9 is permitted because the first engagement surface 60 of the lever 44b is maintained in engagement with the extension 98 of the locking member 42 and is maintained generally between the pivot 54 and the projection 100, which allows the lever 44b to essentially freely move between the pivot 54 and the projection 100 along the extension 98.

Rotating the cylinder 24 in the clockwise direction relative to the view shown in FIG. 9 may be facilitated by providing the lever 44b with a cam follower 66b that extends from the lever 44b to a lesser extent than the cam follower 66 of the ignition module 12, for example. Further, spacing the first engagement surface 60 from the elongated portion 98 of the locking member 42b a smaller distance than a distance the projection 100 extends from the locking member 42 will likewise reduce the efforts required to rotate the cylinder 24 from any of the IGNITE position, the ON/RUN position, or the ACCESSORY POSITION back to the OFF position should the vehicle 10 experience a reduced-power condition. Once the cylinder 24 is returned to the OFF position, the key fob may be removed from the receptacle 32.

Figure 10:
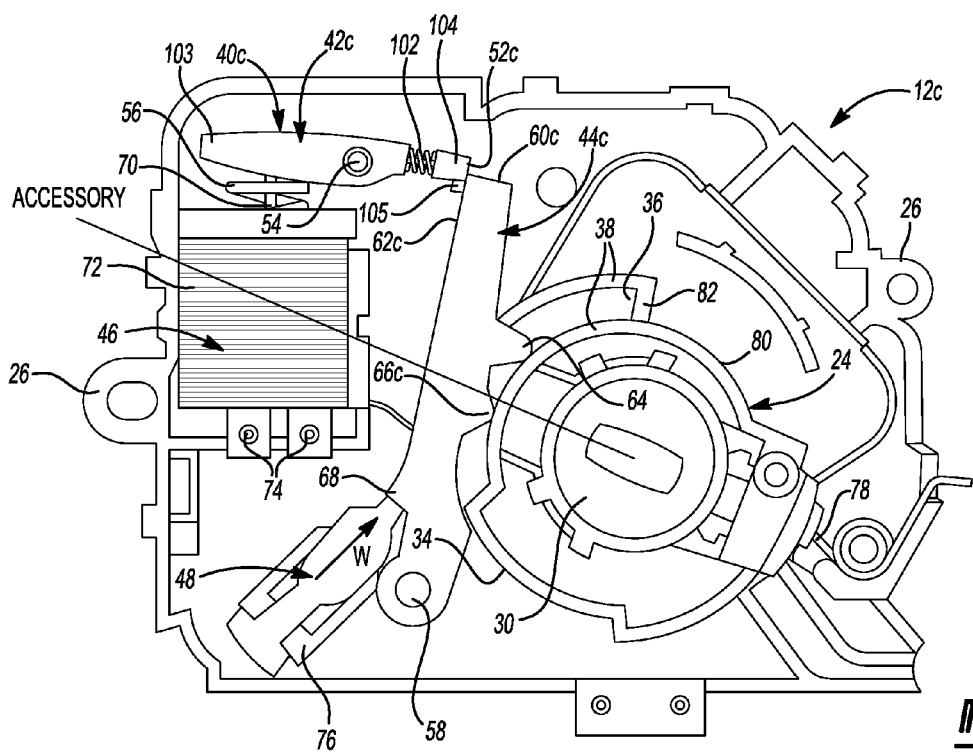
FIG. 10 is a partial rear view of an ignition module in accordance with the principles of the present disclosure.

With particular reference to FIG. 10, an ignition module 12c is provided. In view of the substantial similarity in structure and function of the components associated with the ignition module 12 with respect to the ignition module 12c, like reference numerals are used hereinafter in the drawings to identify like components while like reference numerals containing letter extensions are used to identify those components that have been modified.

The ignition module 12c is virtually identical to the ignition module 12 with the exception that the ignition module 12c includes a locking mechanism 40c in place of the locking mechanism 40. The locking mechanism 40c is substantially identical to the locking mechanism 40 except for locking member 42c. Locking member 42c may include a biasing element 102 disposed between a main body 103 and a movable member 104. The biasing element 102 may bias the movable member 104 in a direction substantially away from the main body 103 and into engagement with the lever 44. The movable member 104 may include a projection 105 extending generally toward the lever 44.

In operation, the cylinder 24 may be moved from the OFF position to any of the ACCESSORY position, the ON/RUN position, or the IGNITE position. In so doing, the cylinder 24 may be rotated in the counterclockwise direction relative to the view shown in FIG. 10, which likewise causes rotation of the lever 44c in the clockwise direction relative to the view shown in FIG. 10. If, for example, the cylinder 24 is rotated in the counterclockwise direction relative to the view shown in FIG. 10 and into the ACCESSORY position, the biasing member 56 will exert a force on the main body 103, thereby causing the locking member 42c to rotate in the clockwise direction relative to the view shown in FIG. 10 and engage the second engagement surface 62c of the lever 44c. The locking member 42c is permitted to rotate in the clockwise direction relative to the view shown in FIG. 10, as the electromagnet 46—to which the locking member 42c is fixed for movement—is in a passive state. In other words, current is not supplied to the electromagnet 46 and therefore, the biasing member 56 is permitted to rotate the locking member 42c in the clockwise direction, thereby causing the output shaft 70 to extend from the wound core 72.

Sufficient rotation of the locking member 42c in the clockwise direction relative to the view shown in FIG. 10 causes the moveable member 104 of the locking member 42c to contact the lever 44. Engagement between the movable member 104 of the locking member 42c and the second engagement surface 62 of the lever 44 restricts rotation of the lever 44 in the counterclockwise direction relative to the view shown in FIG. 10 and therefore prevents the cylinder 24 from rotating into the OFF state.

As described above, restricting rotation of the lever in the counterclockwise direction relative to the view shown in FIG. 10 restricts rotation of the cylinder 24 in the clockwise direction relative to the view shown in FIG. 10 and into the OFF position due to engagement between the cam follower 66 and the outer surface 80 of the cylinder 24. Should the operator wish to move the cylinder 24 from the ACCESSORY position to the OFF position to allow removal of the key fob from the receptacle 32, current may be supplied to the electromagnet 46 to retract the output shaft 70 into the wound core 72, thereby causing the locking member 42c to rotate in the counterclockwise direction relative to the view shown in FIG. 10. Once the locking member 42c is sufficiently rotated in the counterclockwise direction relative to the view shown in FIG. 10, the lever 44 may be rotated in the counterclockwise direction relative to the view shown in FIG. 10 due to engagement between the cam follower 66 of the lever 44 and the cam surface 34 of the cylinder 24. Once the cylinder 24 is sufficiently rotated in the clockwise direction relative to the view shown in FIG. 10 such that the cylinder 24 is returned to the OFF position, the key fob may be removed from the receptacle 32.

If the power source of the vehicle 10 is insufficient or otherwise unavailable, current cannot be supplied to the electromagnet 46. Therefore, the output shaft 70 cannot be withdrawn into the wound core 72 and the locking member 42c cannot be rotated in the counterclockwise direction relative to the view shown in FIG. 10. As such, the locking member 42c is maintained in engagement with the lever 44 and prevents the lever 44 from rotating in the counterclockwise direction relative to the view shown in FIG. 10 and, thus, prevents rotation of the cylinder 24 from any of the IGNITE position, the ON/RUN position, or the ACCESSORY position into the OFF position, if a sufficient force is applied to the cylinder 24 in an effort to rotate the cylinder 24 in the clockwise direction and into the OFF position, a force may be exerted on the lever 44 by the cylinder 24, as the cylinder 24 rotates in the clockwise direction relative to the view shown in FIG. 10. The force applied on the lever 44 causes the lever 44 to rotate in the counterclockwise direction relative to the view shown in FIG. 10 and causes the lever 44 to apply a force on the locking member 42c in a direction substantially along a longitudinal axis of the locking member 42c.

The force applied along the longitudinal axis of the locking member 42c causes the movable member 104 to compress the biasing element 102 disposed between the movable member 104 and the main body 103. As such, the movable member 104 moves toward the main body 103 and reduces the overall effective length of the locking member 42c. Once the movable member 104 is sufficiently moved toward the main body 103, the effective length of the locking member 42c is reduced and the lever 44 is permitted to rotate in the counterclockwise direction relative to the view shown in FIG. 10.

When the lever 44 is permitted to rotate in the counterclockwise direction relative to the view shown in FIG. 10, the cylinder 24 is permitted to rotate in the clockwise direction relative to the view shown in FIG. 10 and is permitted to move from any of the IGNITE position, the ON/RUN position, or the ACCESSORY position into the OFF position. As with the ignition modules 12, 12a, 12b, when the cylinder 24 is returned to the OFF position, a force may be applied to the key fob to remove the key fob from the receptacle 32.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An ignition module comprising:
a housing;
a cam rotatably supported by said housing between an OFF position and an ON position;
a first lever movable between a first state restricting movement of said cam from said ON position to said OFF position and a second state permitting movement of said cam from said ON position to said OFF position;
a second lever movable between a locked state restricting movement of said first lever from said first state to said second state and an unlocked state permitting movement of said first lever from said first state to said second state; and
an electromagnet movable between an extended state and a retracted state, said electromagnet movable into said extended state when energized to position and maintain said second lever in said locked state,
further comprising a first biasing element operable to bias said second lever into said unlocked state.

2. The ignition module of claim 1, wherein said first biasing element moves said second lever into said unlocked state when said electromagnet is de-energized.

3. The ignition module of claim 1, further comprising a second biasing element operable to bias said first lever into said first state.

4. The ignition module of claim 3, wherein said cam includes a cam surface operable to move said first lever from said first state to said second state when said second lever is in said unlocked state.

5. The ignition module of claim 1, wherein said cam includes a cam surface operable to move said first lever from said first state to said second state when said second lever is in said unlocked state.

6. The ignition module of claim 1, wherein said electromagnet is a solenoid.

7. The ignition module of claim 1, wherein said cam includes a channel and said first lever includes an extension, said extension slidably received within said channel when said cam is moved from said OFF position to said ON position and said first lever is in said first state.

8. The ignition module of claim 7, wherein said first lever is biased into said first state.

9. An ignition module for a vehicle having an energy source, the ignition module comprising:
a cam;
a cam rotatably supported by said housing between on OFF position and an ON position;

a first lever movable between a first state restricting movement of said cam from said ON position to said OFF position and a second state permitting movement of said cam from said ON position to said OFF position;

a second lever movable between a locked state restricting movement of said first lever from said first state to said second state and an unlocked state permitting movement of said first lever from said first state to said second state;

an electromagnet movable between an extended state and a retracted state, said electromagnet movable into said extended state to position and maintain said second lever in said locked state; and a release mechanism operable to permit movement of said cam from said ON position to said OFF position when power from said energy source is insufficient to move said electromagnet between said extended state and said retracted state, wherein said release mechanism is a biasing element that biases said second lever into said unlocked state.

10. The ignition module of claim 9, wherein said release mechanism includes a first angled surface associated with said first lever and a second angled surface associated with said second lever, said first angled surface in contact with said second angled surface to permit said first lever to move said second lever from said locked state to said unlocked state against said electromagnet when said first lever moves from said first state to said second state.

11. The ignition module of claim 10, wherein said first lever moves from said first state to said second state in response to movement of said cam from said ON position to said OFF position.

12. The ignition module of claim 9, wherein said second lever includes an extension operable to restrict movement of said first lever from said second state to said first state.

13. The ignition module of claim 12, wherein said extension prevents movement of said first lever into said first state until said cam is in said ON position, said first lever permitted to return to said second state if said cam is not fully moved from said OFF position to said ON position.

14. The ignition module of claim 9, wherein said second lever includes a main body and an extension, said main body in contact with said electromagnet and said extension moveable relative to and along a longitudinal axis of said main body.

15. The ignition module of claim 14, wherein said extension is biased away from a distal end of said main body.

16. The ignition module of claim 14, wherein said extension moves along said longitudinal axis toward said main body when said cam is moved from said ON position to said OFF position and said second lever is in said locked state to permit movement of said first lever from said first state to said second state.

17. The ignition module of claim 9, wherein said electromagnet moves said second lever into said unlocked state when energized.

18. The ignition module of claim 9, wherein said electromagnet moves said second lever into said locked state when energized.

* * * * *